(12) United States Patent
Sharma

(10) Patent No.: US 12,511,785 B2
(45) Date of Patent: Dec. 30, 2025

(54) INTERPRETING COLOR IN AN ENVIRONMENT

(71) Applicant: GM Global Technology Operations LLC, Detroit, MI (US)

(72) Inventor: Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 718 days.

(21) Appl. No.: 17/933,578

(22) Filed: Sep. 20, 2022

(65) Prior Publication Data

US 2024/0095961 A1 Mar. 21, 2024

(51) Int. Cl.
| | |
|---|---|
| G06T 7/90 | (2017.01) |
| G02B 27/01 | (2006.01) |
| G06T 7/50 | (2017.01) |
| G06T 7/62 | (2017.01) |
| G06T 7/70 | (2017.01) |
| G06V 10/56 | (2022.01) |
| G06V 20/59 | (2022.01) |

(52) U.S. Cl.
CPC ............ *G06T 7/90* (2017.01); *G02B 27/0101* (2013.01); *G06T 7/50* (2017.01); *G06T 7/62* (2017.01); *G06T 7/70* (2017.01); *G06V 10/56* (2022.01); *G06V 20/593* (2022.01); *G02B 2027/0112* (2013.01); *G06T 2207/10024* (2013.01); *G06T 2207/30252* (2013.01)

(58) Field of Classification Search
CPC .... G06T 7/90; G06T 7/50; G06T 7/62; G06T 7/70; G06T 2207/10024; G06T 2207/30252; G02B 27/0101; G02B 2027/0112; G06V 10/56; G06V 20/593
See application file for complete search history.

(56) References Cited

U.S. PATENT DOCUMENTS

| | | | | |
|---|---|---|---|---|
| 6,205,244 B1 * | 3/2001 | Bawolek | ................. | G01J 3/524 |
| | | | | 382/167 |
| 6,229,916 B1 * | 5/2001 | Ohkubo | ............... | H04N 1/6052 |
| | | | | 382/167 |

(Continued)

FOREIGN PATENT DOCUMENTS

| | | | | |
|---|---|---|---|---|
| EP | 0371389 A2 | * | 6/1990 | ............... H04N 1/60 |
| JP | 2021081372 A | * | 5/2021 | |
| KR | 19990009458 A | * | 2/1999 | ......... H04N 1/40006 |

OTHER PUBLICATIONS

Y. A. Sari, R. V. Hari Ginardi and N. Suciati, "Color correction using improved linear regression algorithm," 2015 International Conference on Information & Communication Technology and Systems (ICTS), Surabaya, Indonesia, 2015, pp. 73-78, doi: 10.1109/ICTS.2015.7379874. (Year: 2015).*

(Continued)

*Primary Examiner* — Charles T Shedrick
(74) *Attorney, Agent, or Firm* — Vivacqua Crane, PLLC

(57) ABSTRACT

A system for interpreting color includes a camera for capturing images of an environment and a controller in electrical communication with the camera. The controller is programmed to capture an image of the environment using the camera, where the image includes an object, retrieve a color calibration matrix from a non-transitory storage media of the controller, and determine a color of the object in the environment based at least in part on the color calibration matrix and the image of the environment.

14 Claims, 6 Drawing Sheets

(56) References Cited

U.S. PATENT DOCUMENTS

| | | | | |
|---|---|---|---|---|
| 7,136,524 B1* | 11/2006 | Goh | ................ | G06V 10/56 |
| | | | | 382/167 |
| 8,902,248 B1* | 12/2014 | Bidarkar | ................ | G06F 3/14 |
| | | | | 709/219 |
| 9,270,836 B2* | 2/2016 | Shigemoto | ................ | H04N 1/60 |
| 2008/0215279 A1* | 9/2008 | Salsbury | ................ | H05B 45/28 |
| | | | | 702/107 |
| 2012/0099788 A1* | 4/2012 | Bhatti | ................ | H04N 1/6036 |
| | | | | 382/167 |
| 2013/0027721 A1* | 1/2013 | Kobayashi | ................ | H04N 1/6086 |
| | | | | 358/1.9 |
| 2013/0229671 A1* | 9/2013 | Yokozawa | ................ | G06K 15/14 |
| | | | | 358/1.9 |
| 2013/0242319 A1* | 9/2013 | Suzuki | ................ | G06K 15/02 |
| | | | | 358/1.9 |
| 2013/0242320 A1* | 9/2013 | Suzuki | ................ | H04N 1/6033 |
| | | | | 358/1.9 |
| 2013/0242321 A1* | 9/2013 | Okada | ................ | H04N 1/6033 |
| | | | | 358/1.9 |
| 2013/0242361 A1* | 9/2013 | Matsumoto | ................ | G01J 3/0262 |
| | | | | 358/504 |
| 2015/0070737 A1* | 3/2015 | Hirata | ................ | H04N 1/6044 |
| | | | | 358/504 |
| 2015/0158309 A1* | 6/2015 | Fujii | ................ | G01J 3/524 |
| | | | | 347/19 |
| 2015/0296193 A1* | 10/2015 | Cote | ................ | G06T 3/4015 |
| | | | | 382/167 |
| 2017/0238029 A1* | 8/2017 | Kiser | ................ | H04N 23/85 |
| 2018/0088588 A1* | 3/2018 | Ion | ................ | G05D 1/0246 |
| 2020/0162719 A1* | 5/2020 | Tadi | ................ | H04N 13/271 |
| 2020/0211257 A1* | 7/2020 | Moltaji | ................ | G06T 15/04 |
| 2020/0374447 A1* | 11/2020 | Lu | ................ | H04N 1/6086 |
| 2021/0004989 A1* | 1/2021 | Tanaka | ................ | H04N 1/6086 |
| 2022/0101021 A1* | 3/2022 | Neubecker | ................ | G06T 5/77 |
| 2022/0358315 A1* | 11/2022 | Qiu | ................ | G06V 20/56 |
| 2023/0154434 A1* | 5/2023 | Lee | ................ | G09G 5/06 |
| | | | | 345/589 |
| 2023/0360178 A1* | 11/2023 | Hung | ................ | G06V 20/588 |
| 2024/0095961 A1* | 3/2024 | Sharma | ................ | G02B 27/0101 |
| 2024/0394862 A1* | 11/2024 | Sung | ................ | G06V 20/50 |

OTHER PUBLICATIONS

Stephen Wolf, "Color correction matrix for digital still and video imaging systems," Technical Memorandum NTIA TM-04-406, U.S. Department of Commerce, National Telecommunications and Information Administration, Institute for Telecommunication Sciences, Dec. 2003. https://doi.org/10.70220/cpgqt0r3 (Year: 2003).*

C. Sinthanayothin, W. Bholsithi and N. Wongwaen, "Color correction on digital image based on reference color charts surrounding object," 2016 International Symposium on Intelligent Signal Processing and Communication Systems (ISPACS), Phuket, Thailand, 2016, pp. 1-6, doi: 10.1109/ISPACS.2016.7824683. (Year: 2016).*

* cited by examiner

INTERPRETING COLOR IN AN ENVIRONMENT

INTRODUCTION

The present disclosure relates to interpreting color in an environment.

Interpreting color in an environment involves analyzing the environment to identify colors of specific objects in the environment. Systems and methods for interpreting color in the environment may be especially important for individuals having a disability such as, for example, color-vision impairment. Systems and methods have been developed to identify colors of objects in the environment. For example, an image and/or video recording may be analyzed to identify colors of objects. However, analysis of images and/or video recordings may be unreliable due to variations in color calibration between recording devices. Spectral cameras may be used to detect colors in the environment, but use of a spectral camera may result in additional weight, cost, and maintenance.

Therefore, while current systems and methods for interpreting color achieve their intended purpose, there is a need in the art for an improved approach for interpreting color.

SUMMARY

According to several aspects, a system for interpreting color is provided. The system includes a camera for capturing images of an environment and a controller in electrical communication with the camera. The controller is programmed to capture an image of the environment using the camera, where the image includes an object, retrieve a color calibration matrix from a non-transitory storage media of the controller, and determine a color of the object in the environment based at least in part on the color calibration matrix and the image of the environment.

In another aspect of the present disclosure, the controller is further programmed to capture a calibration image of a color reference chart using the camera, where the color reference chart includes a plurality of colored portions. The controller is further programmed to retrieve a plurality of CIE XYZ values from the non-transitory storage media of the controller, where each of the plurality of CIE XYZ values corresponds to one of the plurality of colored portions of the color reference chart. The controller is further programmed to determine a plurality of RGB values in the calibration image, where each of the plurality of RGB values corresponds to one of the plurality of colored portions of the color reference chart in the calibration image. The controller is further programmed to calculate the color calibration matrix based at least in part on the plurality of CIE XYZ values and the plurality of RGB values. The controller is further programmed to store the color calibration matrix in the non-transitory storage media of the controller.

In another aspect of the present disclosure, to calculate the color calibration matrix, the controller is further programmed to calculate the color calibration matrix using a least square regression, the plurality of CIE XYZ values, and the plurality of RGB values.

In another aspect of the present disclosure, to calculate the color calibration matrix using the least square regression, the controller is further programmed to calculate the color calibration matrix by minimizing an equation: $\Sigma_{i=1}^{n} \|M p_i - q_i\|^2$ where n is a total number of the plurality of colored portions in the color reference chart, M is the color calibration matrix, $p_i$ is one of the plurality of RGB values in the calibration image corresponding to a colored portion i of the color reference chart, and $q_i$ is one of the plurality of CIE XYZ values corresponding to the colored portion i of the color reference chart.

In another aspect of the present disclosure, to determine the color of the object in the environment, the controller is further programmed to generate a converted image of the environment by converting the image of the environment to the CIE XYZ color space using the color calibration matrix. To determine the color of the object in the environment, the controller is further programmed to determine the color of the object in the environment based on the converted image of the environment.

In another aspect of the present disclosure, to generate a converted image of the environment by converting the image of the environment to the CIE XYZ color space, the controller is further programmed to determine an XYZ value for each of a plurality of pixels of the converted image of the environment by multiplying an RGB value for each of a plurality of pixels of the image of the environment by the color calibration matrix.

In another aspect of the present disclosure, the system further includes a display for indicating the color of the object in the environment to an occupant of a vehicle. The display is in electrical communication with the controller.

In another aspect of the present disclosure, the display is an augmented reality head-up display (AR-HUD) system in electronic communication with the controller. The AR-HUD system includes an occupant position tracking device and an AR-HUD projector. To indicate the color of the object in the environment to the occupant of the vehicle, the controller is further programmed to determine a position of the occupant of the vehicle using the occupant position tracking device. To indicate the color of the object in the environment to the occupant of the vehicle, the controller is further programmed to calculate a size, shape, and location of a graphic indicating the color of the object in the environment based on the position of the occupant and the image of the environment and display the graphic indicating the color of the object in the environment on a windscreen of the vehicle using the AR-HUD system based on the size, shape, and location of the graphic.

In another aspect of the present disclosure, the display further includes a transparent windscreen display (TWD) system in electronic communication with the controller, where the TWD system includes transparent phosphors embedded in the windscreen of the vehicle and a TWD projector. To indicate the color of the object in the environment to the occupant of the vehicle the controller is further programmed to calculate a size, shape, and location of the graphic indicating the color of the object in the environment based on the image of the environment and display the graphic indicating the color of the object in the environment on the windscreen of the vehicle using the TWD system based on the size, shape, and location of the graphic.

In another aspect of the present disclosure, the display is a human-machine interface (HMI) configured to indicate the color of the object in the environment to the occupant of the vehicle.

According to several aspects, a method for interpreting color is provided. The method includes capturing an image of an environment using a camera, where the image includes an object. The method also includes retrieving a color calibration matrix from a non-transitory storage media of a controller and determining a color of the object in the environment based at least in part on the color calibration matrix and the image of the environment.

In another aspect of the present disclosure, the method further includes capturing a calibration image of a color reference chart using the camera, where the color reference chart includes a plurality of colored portions. The method also includes retrieving a plurality of CIE XYZ values from the non-transitory storage media of the controller, where each of the plurality of CIE XYZ values corresponds to one of the plurality of colored portions of the color reference chart. The method also includes determining a plurality of RGB values in the calibration image, where each of the plurality of RGB values corresponds to one of the plurality of colored portions of the color reference chart in the calibration image. The method also includes calculating the color calibration matrix based at least in part on the plurality of CIE XYZ values and the plurality of RGB values; and storing the color calibration matrix in the non-transitory storage media of the controller.

In another aspect of the present disclosure, calculating the color calibration matrix further may include minimizing an equation: $\Sigma_{i=1}^{n}\|M_{p_i}-q_i\|^2$ where n is a total number of the plurality of colored portions in the color reference chart, M is the color calibration matrix, $p_i$ is one of the plurality of RGB values in the calibration image corresponding to a colored portion i of the color reference chart, and $q_i$ is one of the plurality of CIE XYZ values corresponding to the colored portion i of the color reference chart.

In another aspect of the present disclosure, determining the color of the object in the environment further may include generating a converted image of the environment by converting the image of the environment to the CIE XYZ color space using the color calibration matrix. Determining the color of the object in the environment further may include determining the color of the object in the environment based on the converted image of the environment.

In another aspect of the present disclosure, generating the converted image of the environment by converting the image of the environment to the CIE XYZ color space further may include determining an XYZ value for each of a plurality of pixels of the converted image of the environment by multiplying an RGB value for each of a plurality of pixels of the image of the environment by the color calibration matrix.

In another aspect of the present disclosure, the method further includes indicating the color of the object in the environment to an occupant of a vehicle using a display system.

In another aspect of the present disclosure, the display system is at least one of an augmented reality head-up display (AR-HUD) system, a transparent windshield display (TWD) system, and a human-machine interface (HMI).

According to several aspects, a system for interpreting color for a vehicle is provided. The system includes a camera for capturing images of an environment surrounding the vehicle, a display for providing information to an occupant of the vehicle, and a controller in electrical communication with the camera and the display. The controller is programmed to capture an image of the environment surrounding the vehicle using the camera, where the image includes an object. The controller is further programmed to retrieve a color calibration matrix from a non-transitory storage media of the controller. The controller is further programmed to generate a converted image of the environment surrounding the vehicle by converting the image of the environment surrounding the vehicle to the CIE XYZ color space using the color calibration matrix. The controller is further programmed to determine the color of the object in the environment surrounding the vehicle based on the converted image of the environment surrounding the vehicle. The controller is further programmed to indicate the color of the object in the environment surrounding the vehicle using the display.

In another aspect of the present disclosure, the controller is further programmed to capture a calibration image of a color reference chart using the camera, where the color reference chart includes a plurality of colored portions. The controller is further programmed to retrieve a plurality of CIE XYZ values from the non-transitory storage media of the controller, where each of the plurality of CIE XYZ values corresponds to one of the plurality of colored portions of the color reference chart. The controller is further programmed to determine a plurality of RGB values in the calibration image, where each of the plurality of RGB values corresponds to one of the plurality of colored portions of the color reference chart in the calibration image. The controller is further programmed to calculate the color calibration matrix based at least in part on the plurality of CIE XYZ values and the plurality of RGB values. The controller is further programmed to store the color calibration matrix in the non-transitory storage media of the controller.

In another aspect of the present disclosure, the display is an augmented reality head-up display (AR-HUD) system in electronic communication with the controller. The AR-HUD system includes an occupant position tracking device and an AR-HUD projector. To indicate the color of the object in the environment surrounding the vehicle to the occupant of the vehicle, the controller is further programmed to determine a position of the occupant of the vehicle using the occupant position tracking device and calculate a size, shape, and location of a graphic indicating the color of the object in the environment surrounding the vehicle based on the position of the occupant and the image of the environment surrounding the vehicle. To indicate the color of the object in the environment surrounding the vehicle to the occupant of the vehicle, the controller is further programmed to display the graphic indicating the color of the object in the environment surrounding the vehicle on a windscreen of the vehicle using the AR-HUD system based on the size, shape, and location of the graphic. The display further includes a transparent windscreen display (TWD) system in electronic communication with the controller. The TWD system includes transparent phosphors embedded in the windscreen of the vehicle and a TWD projector. To indicate the color of the object in the environment surrounding the vehicle to the occupant of the vehicle the controller is further programmed to calculate a size, shape, and location of the graphic indicating the color of the object in the environment surrounding the vehicle based on the image of the environment surrounding the vehicle. To indicate the color of the object in the environment surrounding the vehicle to the occupant of the vehicle the controller is further programmed to display the graphic indicating the color of the object in the environment surrounding the vehicle on the windscreen of the vehicle using the TWD system based on the size, shape, and location of the graphic.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
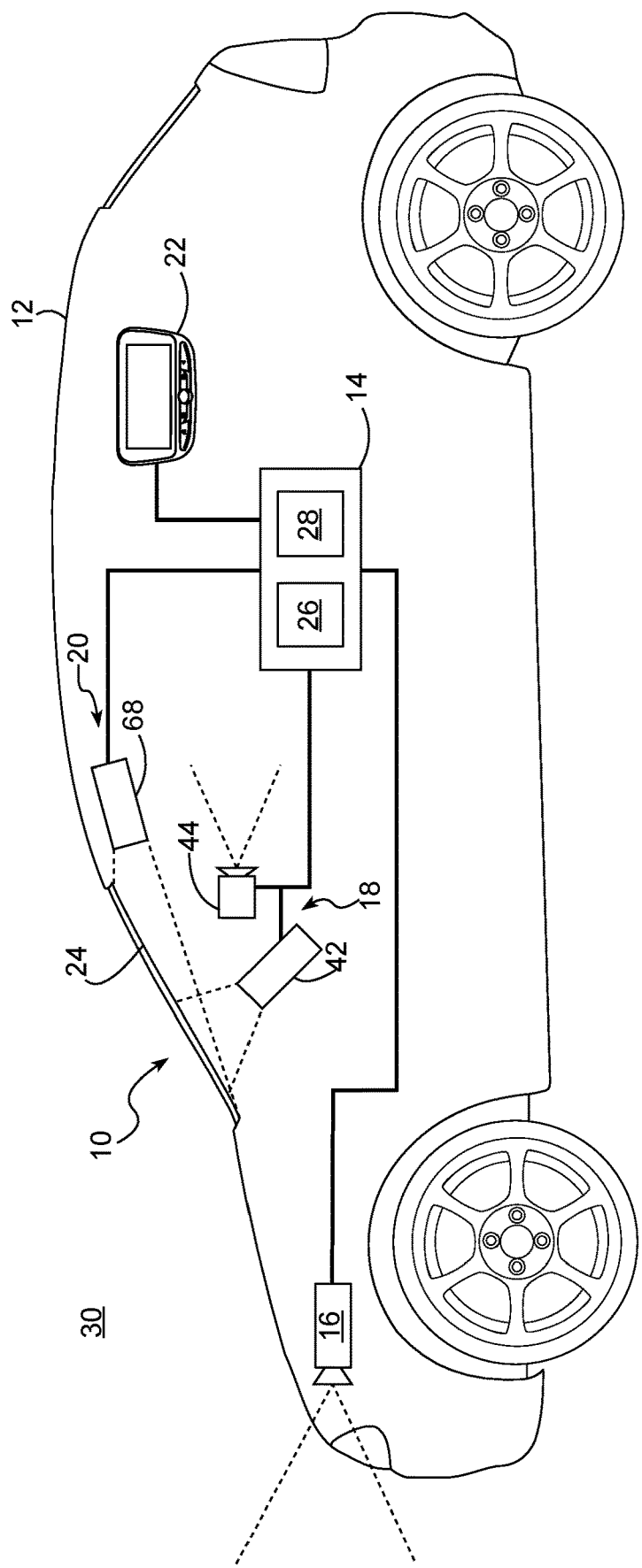
FIG. 1 is a schematic diagram of a system for interpreting color for a vehicle according to an exemplary embodiment.

Referring to FIG. 1, a system for interpreting color is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a camera 16, an augmented reality head-up display (AR-HUD) system 18, a transparent windscreen display (TWD) system 20, and a human-machine interface (HMI) 22.

The controller 14 is used to implement a method 100 for interpreting color, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and non-volatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the camera 16, the AR-HUD system 18, the TWD system 20, and the HMI 22. The electrical communication may be established using, for example, a CAN bus, a Wi-Fi network, a cellular data network, or the like. It should be understood that various additional wired and wireless techniques and communication protocols for communicating with the controller 14 are within the scope of the present disclosure.

The camera 16 is used to capture images and/or videos of an environment 30. In an exemplary embodiment, the camera 16 is a photo and/or video camera which is positioned to view the environment 30 in front of the vehicle 12. In one example, the camera 16 is affixed inside of the vehicle 12, for example, in a headliner of the vehicle 12, having a view through a windscreen 24 of the vehicle 12. In another example, the camera 16 is affixed outside of the vehicle 12, for example, on a roof of the vehicle 12, having a view of the environment 30 in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The camera 16 is in electrical communication with the controller 14 as discussed above.

It should be understood that the system 10 may include additional sensors for determining characteristics of the vehicle 12, for example, vehicle speed, roadway curvature, vehicle location, and/or vehicle steering without departing from the scope of the present disclosure.

Figure 2:
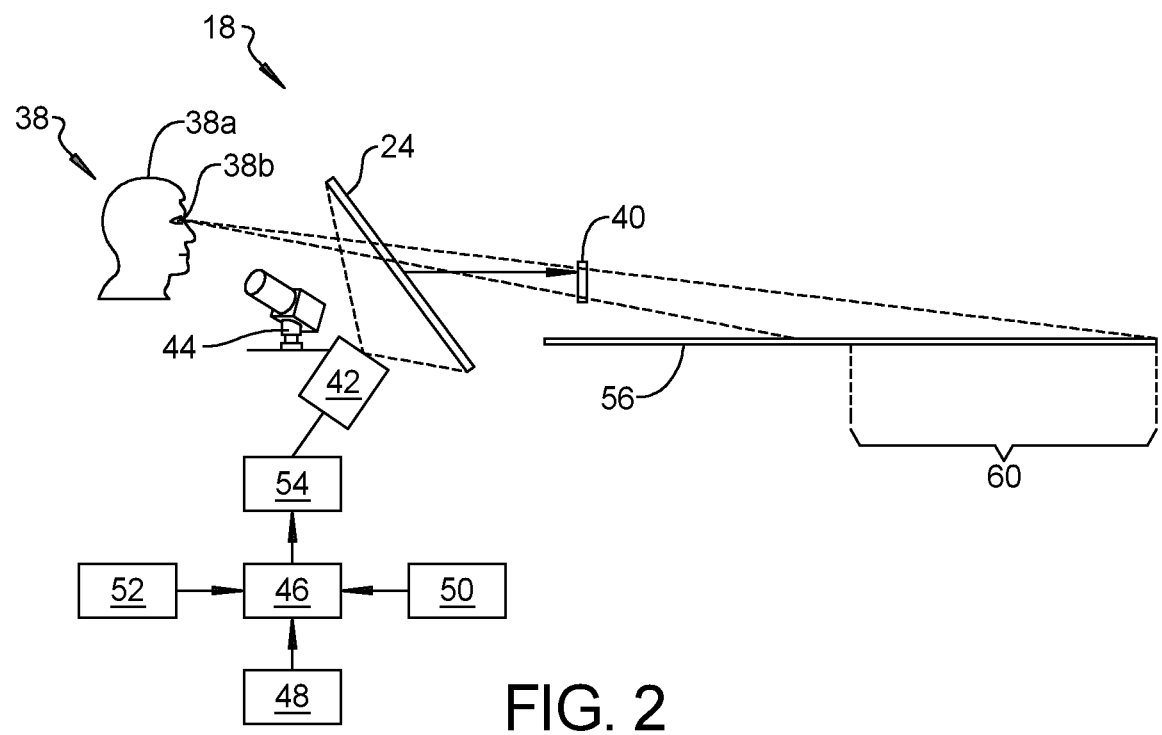
FIG. 2 is a schematic diagram of an AR-HUD system for use by an exemplary occupant according to an exemplary embodiment.

Referring to FIG. 2, a system diagram of the AR-HUD system 18 for use by an exemplary occupant 38 is shown. In the scope of the present disclosure, the occupant includes, in a non-limiting example, a driver, a passenger, and/or any additional persons in the vehicle 12. The AR-HUD system 18 is used to display AR-HUD graphics 40 (i.e., notification symbols providing visual information to the occupant 38) on the windscreen 24 of the vehicle 12. The AR-HUD system 18 includes an AR-HUD projector 42 and an occupant position tracking device 44. The AR-HUD system 18 is in electrical communication with the controller 14 as discussed above.

The AR-HUD projector 42 is used to project the AR-HUD graphics 40 on the windscreen 24 of the vehicle 12. It should be understood that various devices designed to project images including, for example, optical collimators, laser projectors, digital light projectors (DLP), and the like are within the scope of the present disclosure.

The occupant position tracking device 44 is used to determine a position of the occupant 38 in the vehicle 12. For example, the occupant position tracking device 44 may track a position of a head 38a or eyes 38b of the occupant 38. The position of the occupant 38 in the vehicle 12 from the occupant position tracking device 44 is used to locate the AR-HUD graphic 40 on a windscreen 24 of the vehicle 12. In an exemplary embodiment, the occupant position tracking device 44 is one or more cameras disposed in the vehicle 12.

To operate the AR-HUD system 18, the controller 14 includes multiple software modules, including a system manager 46. During operation of the system 10, the system manager 46 receives at least a first input 48, a second input 50, and a third input 52. The first input 48 is indicative of the location of the vehicle 12 in space (i.e., the geographical location of the vehicle 12), the second input 50 is indicative of the vehicle occupant 38 position in the vehicle 12 (e.g., the position of the eyes and/or head of the occupant 38 in the vehicle 12), and the third input 52 is data pertaining to a color of an object in the environment 30 surrounding the vehicle 12, as will be discussed in greater detail below. The first input 48 may include data such as GNSS data (e.g., GPS data), vehicle speed, roadway curvature, and vehicle steering. The second input 50 is received from the occupant position tracking device 44. The third input 52 is data pertaining to the color of the object in the environment 30 surrounding the vehicle 12. The system manager 46 is configured to determine (e.g., compute) the type, size, shape, and color of the AR-HUD graphics 40 to be displayed using the AR-HUD projector 42 based on the first input 48 (i.e., the vehicle location in the environment 30), the second input 50 (e.g., the position of the eyes 38b and/or head 38a of the occupant 38 in the vehicle 12), and the third input 52 (i.e. the color of the object in the environment 30 surrounding the vehicle 12) The system manager 46 instructs an image engine 54, which is a software module or an integrated circuit of the AR-HUD projector 42 or the controller 14, to display the AR-HUD graphic 40 using the AR-HUD projector 42. The image engine 54 displays the AR-HUD graphic 40 on the windscreen 24 of the vehicle 12 using the AR-HUD projector 42 based on the type, size, shape, and color of the AR-HUD graphic 40 determined by the system manager 46. The AR-HUD graphic 40 is projected on the windscreen 24 by the AR-HUD projector 42 to show the AR-HUD graphic 40 along a roadway surface 56.

Figure 3:
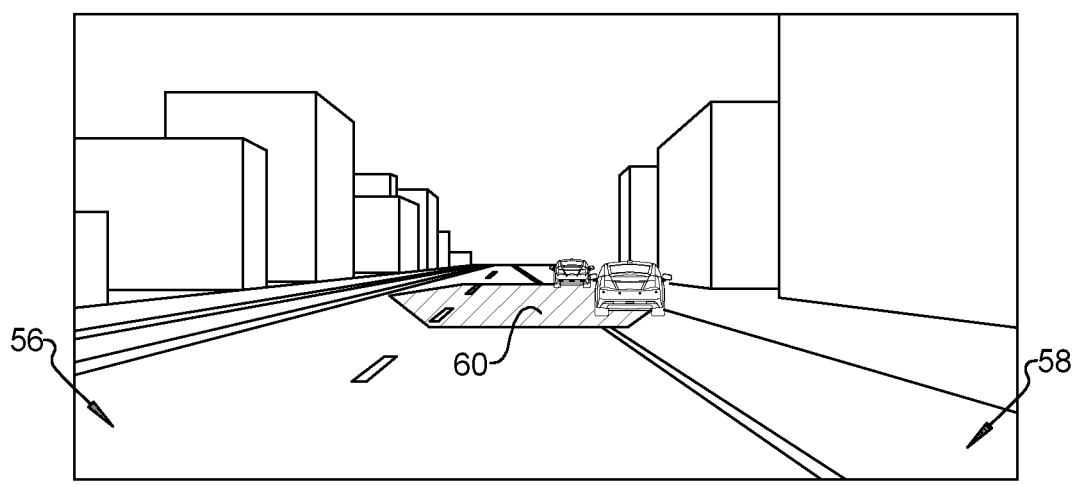
FIG. 3 is a schematic front view of a dual-focal plane augmented reality display, highlighting a second image plane of the dual-focal plane augmented reality display according to an exemplary embodiment.
Figure 4:
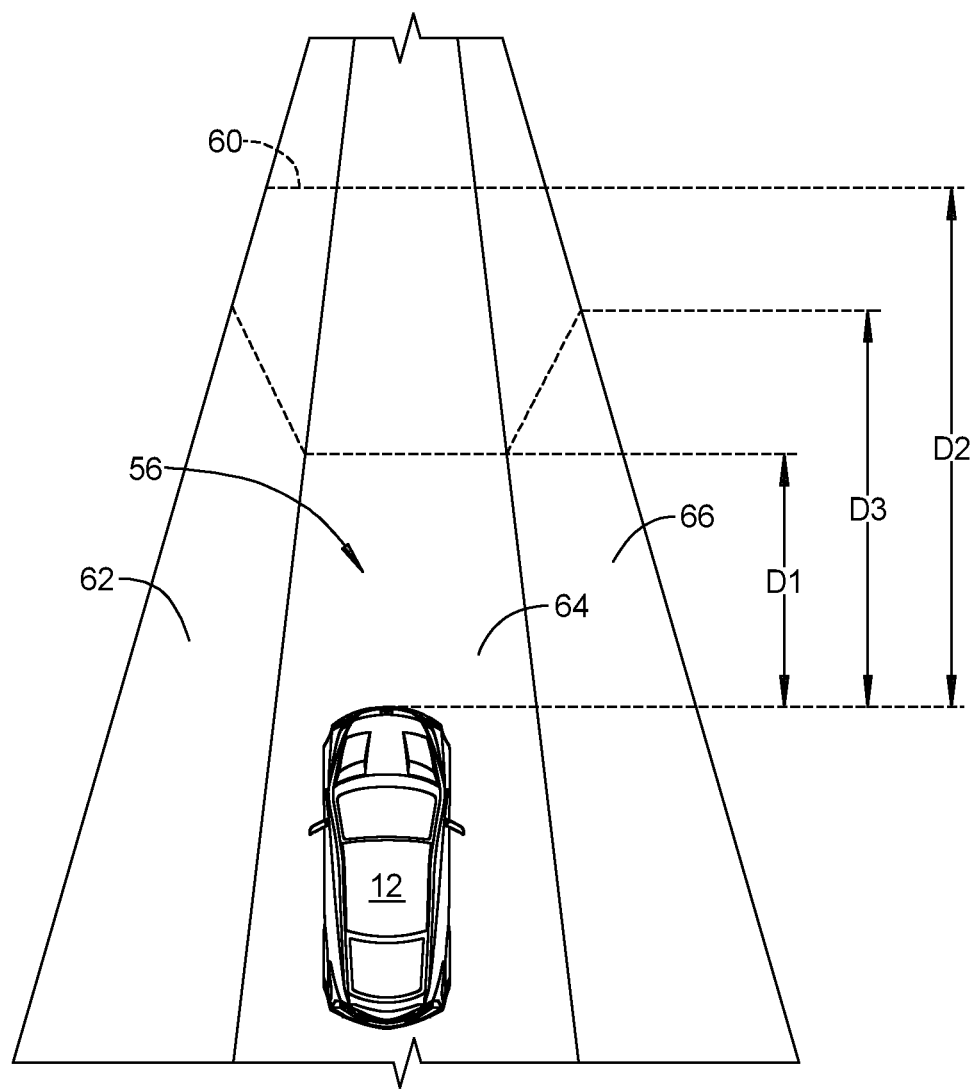
FIG. 4 is a schematic diagram of the second image plane of the dual-focal plane augmented according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 58 and a second image plane 60. The first image plane 58 shows the view of the outside world, and the second image plane 60 is reserved for displaying the AR-HUD graphics 40. The second image plane 60 spans multiple lanes and the AR-HUD graphics 40 appear at a location farther on a roadway surface 56 relative to the first image plane 58. For instance, as shown in FIGS. 3 and 4, the second image plane 60 covers a left lane 62, a central lane 64, and a right lane 66. As a non-limiting example, in the central lane 64, the second image plane 60 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 38 see the AR-HUD graphics 40 displayed using the AR-HUD projector 42. In the left lane 62 and the right lane 66, the second image plane 60 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 38 see the AR-HUD graphics 40 displayed using the AR-HUD projector 42. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 40 on the view of the outside word. For instance, by using a dual-focal plane AR-HUD, the size, location, and characteristics of the AR-HUD graphics 40 may be changed based on, for example, the location of the eyes 38b of the occupant 38.

The TWD system 20 is used to display images on the windscreen 24 of the vehicle 12. In an exemplary embodiment, the AR-HUD system 18 can display the AR-HUD graphics 40 in a predefined region of the windscreen 24 (e.g., in the first image plane 58 and the second image plane 60). The TWD system 20 can display TWD graphics (not shown) in any region of the windscreen 24. Therefore, by operating the AR-HUD system 18 and the TWD system 20 in conjunction, the controller 14 may display graphics in any region of the windscreen 24. In an exemplary embodiment, the TWD system 20 includes transparent phosphors (not shown) embedded into the windscreen 24 and a TWD projector 68 (FIG. 1). The TWD system 20 is in electrical communication with the controller 14 as discussed above.

The transparent phosphors are light emitting particles which fluoresce in response to being excited by the TWD projector 68. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 68 is used to excite the transparent phosphors in a predetermined pattern to produce the TWD graphics on the windscreen 24. In an exemplary embodiment, the TWD projector 68 is a violet/ultraviolet laser projector disposed proximally to the headliner of the vehicle 12. The TWD projector 68 includes three lasers, each laser configured to excite one of the red, green, or blue transparent phosphors.

In an exemplary embodiment, the HMI 22 is used in addition to the AR-HUD system 18 and the TWD system 20 to display information to the occupant 38 of the vehicle 12. In another exemplary embodiment, the HMI 22 is used instead of the AR-HUD system 18 and/or the TWD system 20 to display information to the occupant 38 of the vehicle 12. In the aforementioned exemplary embodiments, the HMI 22 is a display system located in view of the occupant 38 and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the controller 14 as discussed above.

Figure 5:
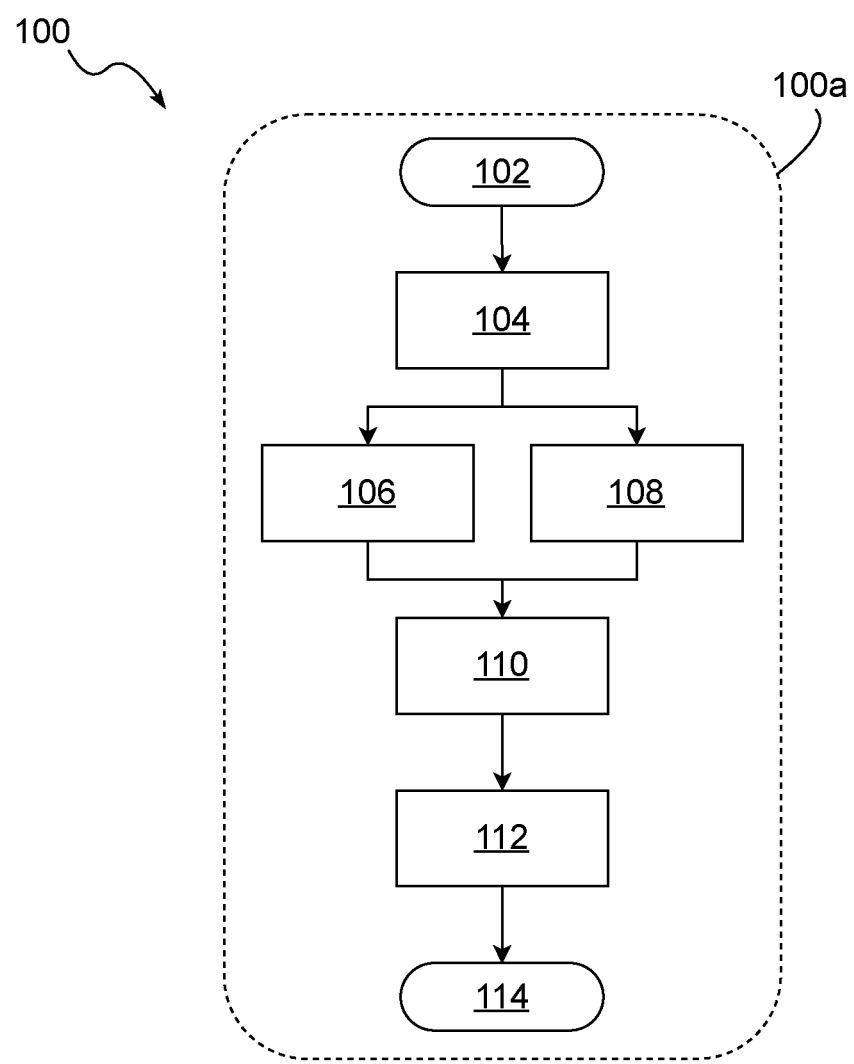
FIG. 5 is a flowchart of a method for determining a color calibration matrix according to an exemplary embodiment.
Figure 7:
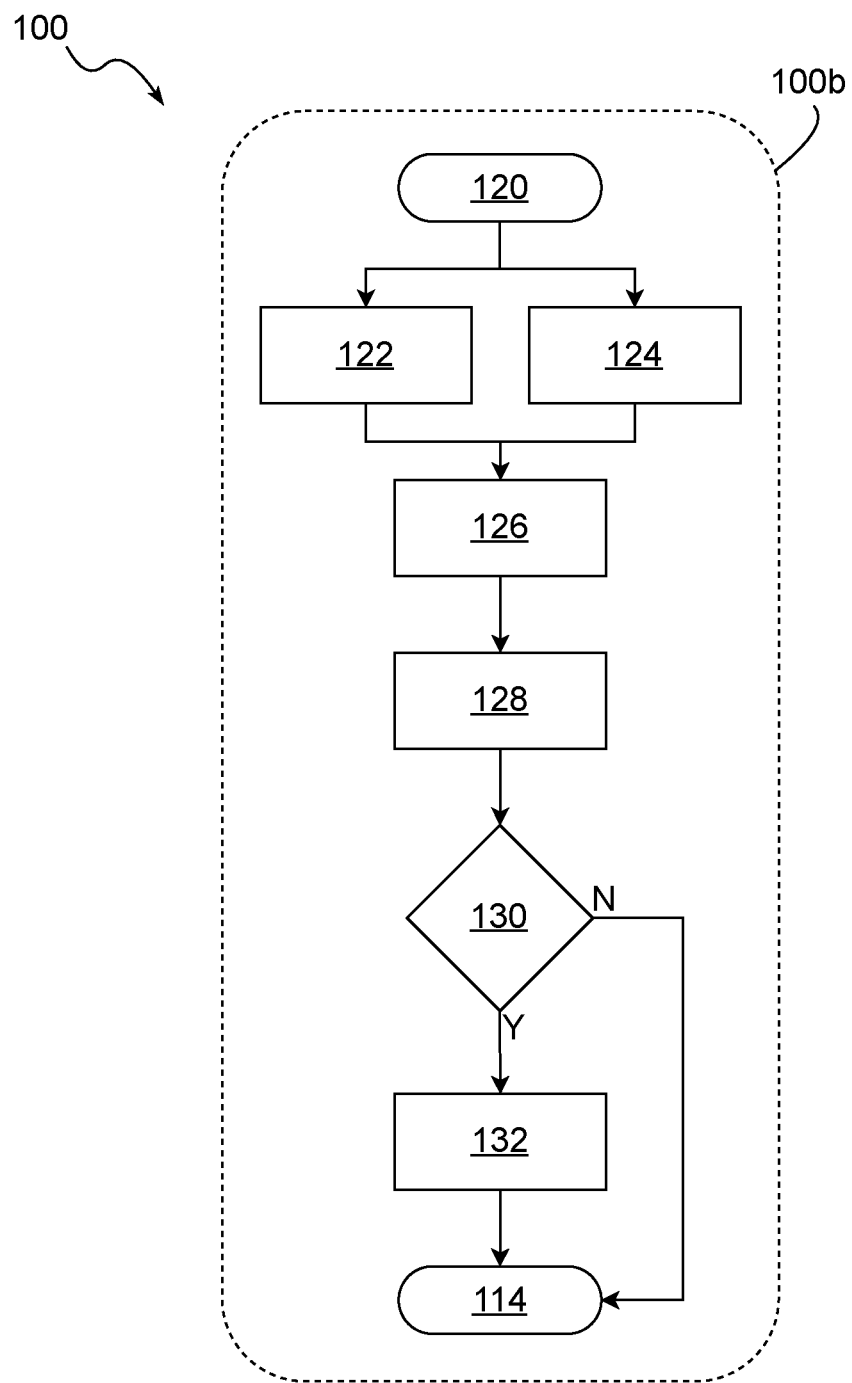
FIG. 7 is a flowchart of a method for interpreting color in an environment and providing information about color in the environment to an occupant according to an exemplary embodiment.

Referring to FIGS. 5 and 7, a flowchart of the method for interpreting color is generally indicated by reference number 100. The method 100 includes two sub-methods, sub-method 100a for determining a color calibration matrix, and sub-method 100b for interpreting color in the environment 30 and providing information about color in the environment 30 to the occupant 38.

Referring to FIG. 5, the sub-method 100a begins at block 102 and proceeds to block 104. At block 104, the controller 14 uses the camera 16 to capture a calibration image of a color reference chart 200 (shown in FIG. 6).

Figure 6:
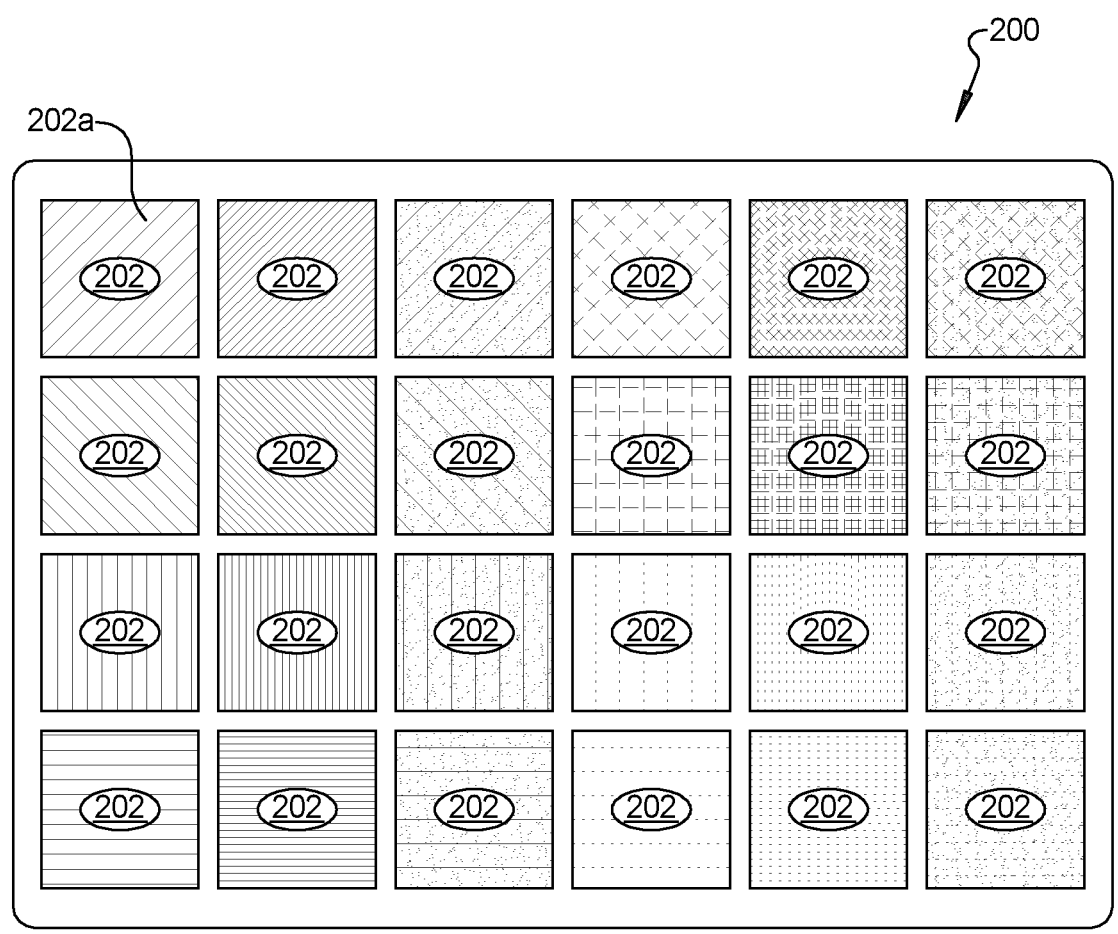
FIG. 6 is a schematic diagram of a color reference chart according to an exemplary embodiment.

Due to variations in factors such as design, materials, and manufacturing process, the color response of the camera 16 may be inconsistent across different camera models and/or individual camera units. Accordingly, the color reference chart 200 is used measure the color response of the camera 16 such that images produced by the camera 16 may be adjusted to more accurately represent colors in the environment 30. Referring to FIG. 6, the color reference chart 200 includes a plurality of colored portions 202. In the exemplary embodiment, shown in FIG. 6, the plurality of colored portions 202 are arranged in a grid. In an exemplary embodiment, a color of each of the plurality of colored portions 202 is selected to mimic the color of natural objects, such as, for example, human skin, foliage, and/or flowers. In a further non-limiting example, the color of each of the plurality of colored portions 202 is selected to mimic the color of objects relevant to a driving task, for example, traffic signs, traffic signals, and/or road markings. In another exemplary embodiment, the color reference chart 200 may be self-illuminated, meaning that each of the plurality of colored portions 202 additionally includes a light source (not shown). The color reference chart 200 shown in FIG. 6 is merely exemplary in nature, and color reference charts having different and/or additional colored portions 202 are within the scope of the present disclosure.

After block 104, the sub-method 100a proceeds to blocks 106 and 108. At block 106, the controller 14 retrieves a plurality of CIE XYZ values from the non-transitory media 28. Each of the plurality of CIE XYZ values corresponds to one of the plurality of colored portions 202 of the color reference chart 200. CIE XYZ values quantitatively link wavelengths in the electromagnetic visible spectrum to physiologically perceived colors in human color vision. In other words, a CIE XYZ value defines a color in absolute terms, irrespective of the device, ink, or medium used to capture, display, or print the color. In a non-limiting example, the CIE XYZ value corresponding to a first colored portion 202a of the plurality of colored portions 202 is X:0.125, Y:0.109, Z:0.078.

At block 108, the controller 14 determines a plurality of RGB values based on the image of the color reference chart 200 captured at block 104 (i.e., the calibration image). Each of the plurality of RGB values corresponds to one of the plurality of colored portions 202 of the color reference chart 200. In a non-limiting example, the RGB value corresponding to the first colored portion 202a of the plurality of colored portions 202 in the image captured at block 104 is R:111, G:89, B:80. After blocks 106 and 108, the sub-method 100a proceeds to block 110.

At block 110, the color calibration matrix is calculated based on the plurality of CIE XYZ values retrieved at block 106 and the plurality of RGB values determined at block 108. The color calibration matrix is a mathematical matrix which is a conversion factor between RGB values and CIE XYZ values. Therefore, the color calibration matrix allows conversion between RGB values and CIE XYZ values. The relationship between RGB values and CIE XYZ values is dependent on the color response of the camera 16. As discussed above, the color response of the camera 16 may be inconsistent across different camera models and/or individual camera units. Therefore, in an exemplary embodiment, the color calibration matrix is specific to a particular camera unit. In another exemplary embodiment, the color calibration matrix is specific to a particular model of camera. $\min\{\Sigma_{i=1}^{n} \|M_{p_i} - q_i\|^2\}$ In an exemplary embodiment, the color calibration matrix is calculated using a least square regression, by minimizing the sum of the squares of the errors (i.e., the mean squared error) between each of the plurality of CIE XYZ values and the corresponding RGB value of the plurality of RGB values:

$$\min\left\{\sum_{i=1}^{n} \|Mp_i - q_i\|^2\right\}$$

wherein n is a total number of the plurality of colored portions 202 in the color reference chart 200, M is the color calibration matrix, $p_i$ is one of the plurality of RGB values in the image of the color reference chart 200 captured at block 104 corresponding to a colored portion i of the color reference chart 200, and $q_i$ is one of the plurality of CIE XYZ values corresponding to the colored portion i of the color reference chart 200.

Additional methods for calculating the color calibration matrix, for example, by minimizing a sum of angles between each of the plurality of RGB values and each of the plurality of CIE XYZ values are also within the scope of the present disclosure.

After block 110, the sub-method 100a proceeds to block 112. At block 112, the controller 14 stores the color calibration matrix calculated at block 110 in the non-transitory media 28 of the controller 14. After block 112, the sub-method 100a proceeds to enter a standby state at block 114.

As discussed above, the color calibration matrix may be specific to, for example, a particular model of camera. Alternatively, the color calibration matrix may be specific to, for example, a particular camera unit. Therefore, in an exemplary embodiment, the sub-method 100a for determining the color calibration matrix is performed one time in a laboratory setting using a single system 10. The color calibration matrix is then electronically transferred to the non-transitory media 28 of the controller 14 of each subsequently manufactured system 10 during the manufacturing process. In another exemplary embodiment, the sub-method 100a for determining the color calibration matrix is performed in a factory setting using each individually manufactured system 10 during the manufacturing process. In both of the aforementioned exemplary embodiments, the sub-method 100a for determining the color calibration matrix is performed once, during either the development or the manufacturing process of the system 10. In yet another exemplary embodiment, a service technician may configure the controller 14 to perform the sub-method 100a for determining the color calibration matrix after replacement and/or service of the camera 16, such that the color calibration matrix stored in the non-transitory media 28 of the controller 14 is updated.

Referring to FIG. 7, the sub-method 100b for interpreting color in the environment 30 and providing information about color in the environment 30 to the occupant 38 of the vehicle 12 is used to increase occupant awareness of the environment 30. The sub-method 100b begins at block 120 and proceeds to blocks 122 and 124.

At block 122, the controller 14 uses the camera 16 to capture an image of the environment 30 surrounding the vehicle 12. The image of the environment 30 surrounding the vehicle 12 includes a plurality of pixels, each of the plurality of pixels defining a portion of the image having a single color. The color of each of the plurality of pixels of the image is defined as an RGB value. At block 124, the controller 14 retrieves the color calibration matrix calculated using the sub-method 100a from the non-transitory media 28 of the controller 14. After blocks 122 and 124, the sub-method 100b proceeds to block 126.

At block 126, the controller 14 uses the color calibration matrix retrieved at block 124 to convert the RGB values defining the color of each of the plurality of pixels of the image captured at block 122 to CIE XYZ values. In an exemplary embodiment, to convert the RGB values to CIE XYZ values, each RGB value is multiplied by the color calibration matrix retrieved at block 124. After block 126, the sub-method 100b proceeds to block 128.

At block 128, the converted image of the environment 30 generated at block 126 is analyzed to identify an object having predetermined characteristics. In the scope of the present disclosure, the predetermined characteristics may include a particular color and/or type of object. In an exemplary embodiment, the occupant 38 may choose to be receive information about the color of illuminated lights of traffic signals. Accordingly, at block 128, the controller 14 analyzes the converted image of the environment 30 to identify a traffic signal and determine a color of an illuminated light of the traffic signal. Because the color of each of the plurality of pixels of the converted image is defined by a CIE XYZ value, the color of each of the plurality of pixels of the converted image may be accurately and quantitatively determined. After block 128, the sub-method 100*b* proceeds to block 130.

At block 130, if no object having the predetermined characteristics are identified at block 128, the sub-method 100*b* proceeds to enter a standby state at block 114. If at least one object in the environment 30 surrounding the vehicle 12 is identified at block 128, the sub-method 100*b* proceeds to block 132.

At block 132, the controller 14 uses the AR-HUD system 18, the TWD system 20, and/or the HMI 22 to display a graphic as described above in reference to FIGS. 1 through 4. After block 132, the sub-method 100*b* proceeds to enter the standby state at block 114.

In an exemplary embodiment, the controller 14 may repeatedly exit the standby state 114 and restart the sub-method 100*b* at block 120. In a non-limiting example, the controller 14 may exit the standby state 114 and restart the sub-method 100*b* on a timer, for example, every three hundred milliseconds. By repeatedly performing the sub-method 100*b*, the displayed graphics are updated.

The system and method of the present disclosure offer several advantages. Using the system 10 and the sub-method 100*a* to generate the color calibration matrix results in increased accuracy of the system 10 when performing sub-method 100*b*. This is because the color calibration matrix allows the system 10 to compensate for the color response of the camera 16. Compensating for the color response of the camera 16 allows for accurate and quantitative identification of colors in images captured by the camera 16 without the need for additional equipment which may be cost prohibitive.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for interpreting color, the system comprising:
a camera for capturing images of an environment;
a controller in electrical communication with the camera, wherein the controller is programmed to:
   capture an image of the environment using the camera, wherein the image includes an object;
   retrieve a color calibration matrix from a non-transitory storage media of the controller;
   determine a color of the object in the environment based at least in part on the color calibration matrix and the image of the environment;
   capture a calibration image of a color reference chart using the camera, wherein the color reference chart includes a plurality of colored portions;
   retrieve a plurality of CIE XYZ values from the non-transitory storage media of the controller, wherein each of the plurality of CIE XYZ values corresponds to one of the plurality of colored portions of the color reference chart;
   determine a plurality of RGB values in the calibration image, wherein each of the plurality of RGB values corresponds to one of the plurality of colored portions of the color reference chart in the calibration image;
   calculate the color calibration matrix using a least square regression, the plurality of CIE XYZ values, and the plurality of RGB values by minimizing an equation:

$$\sum_{i=1}^{n} \|Mp_i - q_i\|^2$$

wherein n is a total number of the plurality of colored portions in the color reference chart, M is the color calibration matrix, $p_i$ is one of the plurality of RGB values in the calibration image corresponding to a colored portion $i$ of the color reference chart, and $q_i$ is one of the plurality of CIE XYZ values corresponding to the colored portion $i$ of the color reference chart; and
   store the color calibration matrix in the non-transitory storage media of the controller.

2. The system of claim 1, wherein to determine the color of the object in the environment, the controller is further programmed to:
   generate a converted image of the environment by converting the image of the environment to the CIE XYZ color space using the color calibration matrix; and
   determine the color of the object in the environment based on the converted image of the environment.

3. The system of claim 2, wherein to generate a converted image of the environment by converting the image of the environment to the CIE XYZ color space, the controller is further programmed to:
   determine an XYZ value for each of a plurality of pixels of the converted image of the environment by multiplying an RGB value for each of a plurality of pixels of the image of the environment by the color calibration matrix.

4. The system of claim 1, further including a display for indicating the color of the object in the environment to an occupant of a vehicle, wherein the display is in electrical communication with the controller.

5. The system of claim 4, wherein the display is an augmented reality head-up display (AR-HUD) system in electronic communication with the controller, wherein the AR-HUD system includes an occupant position tracking device and an AR-HUD projector, and wherein to indicate the color of the object in the environment to the occupant of the vehicle, the controller is further programmed to:
   determine a position of the occupant of the vehicle using the occupant position tracking device;
   calculate a size, shape, and location of a graphic indicating the color of the object in the environment based on the position of the occupant and the image of the environment; and
   display the graphic indicating the color of the object in the environment on a windscreen of the vehicle using the AR-HUD system based on the size, shape, and location of the graphic.

6. The system of claim 5, wherein the display further includes a transparent windscreen display (TWD) system in electronic communication with the controller, wherein the TWD system includes transparent phosphors embedded in the windscreen of the vehicle and a TWD projector, and wherein to indicate the color of the object in the environment to the occupant of the vehicle the controller is further programmed to:
calculate a size, shape, and location of the graphic indicating the color of the object in the environment based on the image of the environment; and
display the graphic indicating the color of the object in the environment on the windscreen of the vehicle using the TWD system based on the size, shape, and location of the graphic.

7. The system of claim 4, wherein the display is a human-machine interface (HMI) configured to indicate the color of the object in the environment to the occupant of the vehicle.

8. A method for interpreting color, the method comprising:
capturing an image of an environment using a camera, wherein the image includes an object;
retrieving a color calibration matrix from a non-transitory storage media of a controller; and
determining a color of the object in the environment based at least in part on the color calibration matrix and the image of the environment;
capturing a calibration image of a color reference chart using the camera, wherein the color reference chart includes a plurality of colored portions;
retrieving a plurality of CIE XYZ values from the non-transitory storage media of the controller, wherein each of the plurality of CIE XYZ values corresponds to one of the plurality of colored portions of the color reference chart;
determining a plurality of RGB values in the calibration image, wherein each of the plurality of RGB values corresponds to one of the plurality of colored portions of the color reference chart in the calibration image;
calculating the color calibration matrix based at least in part on the plurality of CIE XYZ values and the plurality of RGB values by minimizing an equation:

$$\sum_{i=1}^{n} \|Mp_i - q_i\|^2$$

wherein n is a total number of the plurality of colored portions in the color reference chart, M is the color calibration matrix, $p_i$ is one of the plurality of RGB values in the calibration image corresponding to a colored portion i of the color reference chart, and $q_i$ is one of the plurality of CIE XYZ values corresponding to the colored portion i of the color reference chart; and
storing the color calibration matrix in the non-transitory storage media of the controller.

9. The method of claim 8, wherein determining the color of the object in the environment further comprises:
generating a converted image of the environment by converting the image of the environment to the CIE XYZ color space using the color calibration matrix; and
determining the color of the object in the environment based on the converted image of the environment.

10. The method of claim 9, wherein generating the converted image of the environment by converting the image of the environment to the CIE XYZ color space further comprises:
determining an XYZ value for each of a plurality of pixels of the converted image of the environment by multiplying an RGB value for each of a plurality of pixels of the image of the environment by the color calibration matrix.

11. The method of claim 8, further comprising indicating the color of the object in the environment to an occupant of a vehicle using a display system.

12. The method of claim 11, wherein the display system is at least one of: an augmented reality head-up display (AR-HUD) system, a transparent windshield display (TWD) system, and a human-machine interface (HMI).

13. A system for interpreting color for a vehicle, the system comprising:
a camera for capturing images of an environment surrounding the vehicle;
a display for providing information to an occupant of the vehicle;
a controller in electrical communication with the camera and the display, wherein the controller is programmed to:
capture an image of the environment surrounding the vehicle using the camera, wherein the image includes an object;
retrieve a color calibration matrix from a non-transitory storage media of the controller;
generate a converted image of the environment surrounding the vehicle by converting the image of the environment surrounding the vehicle to the CIE XYZ color space using the color calibration matrix;
determine the color of the object in the environment surrounding the vehicle based on the converted image of the environment surrounding the vehicle;
indicate the color of the object in the environment surrounding the vehicle using the display;
capture a calibration image of a color reference chart using the camera, wherein the color reference chart includes a plurality of colored portions;
retrieve a plurality of CIE XYZ values from the non-transitory storage media of the controller, wherein each of the plurality of CIE XYZ values corresponds to one of the plurality of colored portions of the color reference chart;
determine a plurality of RGB values in the calibration image, wherein each of the plurality of RGB values corresponds to one of the plurality of colored portions of the color reference chart in the calibration image;
calculate the color calibration matrix using a least square regression, the plurality of CIE XYZ values, and the plurality of RGB values by minimizing an equation:

$$\sum_{i=1}^{n} \|Mp_i - q_i\|^2$$

wherein n is a total number of the plurality of colored portions in the color reference chart, M is the color calibration matrix, $p_i$ is one of the plurality of RGB values in the calibration image corresponding to a colored portion i of the color reference chart, and $q_i$ is one of the plurality of CIE XYZ values corresponding to the colored portion i of the color reference chart; and
store the color calibration matrix in the non-transitory storage media of the controller.

14. The system of claim 13, wherein:
the display is an augmented reality head-up display (AR-HUD) system in electronic communication with the controller, wherein the AR-HUD system includes an occupant position tracking device and an AR-HUD projector, and wherein to indicate the color of the object in the environment surrounding the vehicle to the occupant of the vehicle, the controller is further programmed to:
determine a position of the occupant of the vehicle using the occupant position tracking device;
calculate a size, shape, and location of a graphic indicating the color of the object in the environment surrounding the vehicle based on the position of the occupant and the image of the environment surrounding the vehicle; and
display the graphic indicating the color of the object in the environment surrounding the vehicle on a windscreen of the vehicle using the AR-HUD system based on the size, shape, and location of the graphic;
and wherein the display further includes:
a transparent windscreen display (TWD) system in electronic communication with the controller, wherein the TWD system includes transparent phosphors embedded in the windscreen of the vehicle and a TWD projector, and wherein to indicate the color of the object in the environment surrounding the vehicle to the occupant of the vehicle the controller is further programmed to:
calculate a size, shape, and location of the graphic indicating the color of the object in the environment surrounding the vehicle based on the image of the environment surrounding the vehicle; and
display the graphic indicating the color of the object in the environment surrounding the vehicle on the windscreen of the vehicle using the TWD system based on the size, shape, and location of the graphic.

* * * * *